US009085488B2

(12) United States Patent
Kalb et al.

(10) Patent No.: US 9,085,488 B2
(45) Date of Patent: Jul. 21, 2015

(54) STABILIZED SULFUR BINDING USING ACTIVATED FILLERS

(75) Inventors: Paul D. Kalb, Wading River, NY (US); Vyacheslav P. Vagin, Korolev (RU); Sergey P. Vagin, Almaty (KZ); Lyudmila Vagina, legal representative, Almaty (KZ)

(73) Assignee: Brookhaven Science Associates, LLC, Upton, NY (US)

( * ) Notice: Subject to any disclaimer, the term of this patent is extended or adjusted under 35 U.S.C. 154(b) by 751 days.

(21) Appl. No.: 13/146,344

(22) PCT Filed: Jan. 26, 2009

(86) PCT No.: PCT/RU2009/000020
§ 371 (c)(1),
(2), (4) Date: Nov. 1, 2011

(87) PCT Pub. No.: WO2010/085165
PCT Pub. Date: Jul. 29, 2010

(65) Prior Publication Data
US 2012/0097074 A1 Apr. 26, 2012

(51) Int. Cl.
C04B 28/32 (2006.01)
C04B 20/10 (2006.01)
C04B 28/36 (2006.01)

(52) U.S. Cl.
CPC ............. *C04B 20/1044* (2013.01); *C04B 28/36* (2013.01)

(58) Field of Classification Search
CPC ........................... C04B 28/36; C04B 20/1044
USPC ............................... 106/287.32, 285; 524/443
See application file for complete search history.

(56) References Cited

U.S. PATENT DOCUMENTS

| 4,311,826 A | 1/1982 | McBee et al. |
| 4,496,659 A | 1/1985 | Nimer et al. |

FOREIGN PATENT DOCUMENTS

| CA | 1086884 | 9/1980 |
| CA | 1086884 A | 9/1980 |
| EA | 200801512 A1 | 12/2008 |
| GB | 2868 | 0/1898 |
| GB | 189802888 A | 0/1898 |
| KR | 10-2008-0018251 | 2/2008 |
| KR | 10-2008-0018251 A | 2/2008 |
| RU | 2105739 C1 | 2/1998 |
| RU | 2105739 C1 | 2/1998 |
| RU | 2154602 C1 | 1/2000 |
| RU | 2154602 C1 | 8/2000 |
| RU | 2319077 C1 | 3/2008 |
| RU | 2319677 C1 | 3/2008 |
| SU | 1650631 A1 | 5/1991 |
| SU | 1650637 A1 | 5/1991 |
| UA | 47882 A | 7/2002 |
| WO | WO 2007/065920 A2 | 6/2007 |
| WO | WO2007065920 A2 | 6/2007 |

OTHER PUBLICATIONS

"Points of Interest", Create Blog (Swiftcraft reference) (Mar. 15, 2013).*
Rarel, "How High Shear Mixers Work"; "Definition of High Shear", (2010, no month available).*
Jin Fengqing, "Sulfur Concrete Comes into the World", Jilin Building Materials, vol. 4, pp. 40-43 (1998).
Gregor, R., et al., "A New Approach to Sulfur Concrete," 173 $^{rd}$ *Meeting of the American Chemical Society*, pp. 54-78 and title page, (New Orleans, LA, Mar. 22-23, 1977) in: New Uses of Sulfur-II, Advances in Chemistry, Series N, vol. 165, American Chemical Society, Washington D.C., 1978.
International Search Report of International Application PCT/RU2009/000020—Date Mailed: Oct. 15, 2009, 3 pages.
Written Opinion of the International Searching Authority of International Application No. PCT/RU2009/000020—Date mailed: Oct. 15, 2009, 5 pages.
Jong, B., et al., "Fiber Reinforcement of Sulfur Concrete to Enhance Flexural Properties," Report of Investigations, No. 8956 U.S. Department of the Interior, Bureau of Mines, pp. 1-12, 1985, cover page, bibliographic page, table of contents and abbreviation page.
McBee, W., et al. "Development of Specialized Sulfur Concretes," Report of Investigations No. 8346 U.S. Department of the Interior, Bureau of Mines, pp. 1-21, 1979, cover page, bibliographic page and table of contents.
McBee, W., et al. "Modified-Sulfur Cements for Use in Concretes, Flexible Pavings, Coatings and Grouts," Report of Investigations No. 8545 U.S. Department of the Interior, Bureau of Mines, pp. 1-22, 1981 cover page, bibliographic page and table of contents (2 pages).
McBee, W., et al. "Industrial Evaluation of Sulfur Concrete in Corrosive Environments," Report of Investigations No. 8786 U.S. Department of the Interior, Bureau of Mines, pp. 1-15, 1983, cover page, bibliographic page, table of contents and abbreviation page.
McBee, W., et al. "Sulphur Polymer Cement for Chemically Resistant Concrete," *Construction and Building Materials*, vol. 2, No. 4, pp. 220-224, 1988.
Mohamed, A., et al., "Hydro-Mechanical Behavior of a Newly Developed Sulfur Polymer Concrete," *Cement & Concrete Composites*, vol. 31, pp. 186-194, 2009.
Sullivan, T., "*Sulphur Polymer Cement Concrete*," (The Sulphur Institute, 1994), pp. 1-57 with lists (2 pages), cover page, title page, bibliographic pages, table of contents (5 pages), preface and disclaimer [online] [retrieved Jun. 21, 2013 from: <URL:http://www.picosearch.com/cgi-bin/ts.pl?index=454190;query=Design%20and%20Construction%20Manual;x=12;y=7>.
Sulphur. Annual Report of the Sulphur Institute, pp. 1-16 with cover page and table of contents, 1992.

(Continued)

Primary Examiner — David M Brunsman
(74) Attorney, Agent, or Firm — Dorene M. Price

(57) ABSTRACT

A method of making a stable, sulfur binding composite comprising impregnating a solid aggregate with an organic modifier comprising unsaturated hydrocarbons with at least one double or triple covalent bond between adjacent carbon atoms to create a modifier-impregnated aggregate; heating and drying the modifier-impregnated aggregate to activate the surface of the modifier-impregnated aggregate for reaction with sulfur.

37 Claims, No Drawings

(56) References Cited

OTHER PUBLICATIONS

Vroom, A., "Sulfurcrete: Another Option in the Energy/Materials Picture," *The Military Engineer*, vol. 71, pp. 250-252, 1979.

American Society for Testing and Materials Standard Test, ASTM C-39/C 39M-05, [online] [retrieved Jan. 10, 2014] from the internet <URL: http://www.astm.org>.

Kinkead, E., et al., "The Mammalian Toxicity of Dicyclopentadiene," Toxicology and Applied Pharmacology, vol. 20, pp. 552-561, 1971.

State Intellectual Property Office of P.R.C., Notification of the First Office Action and the First Office Action, Application No. 200980155327.3, date mailed: Dec. 24, 2012, 8 pages.

State Intellectual Property Office of P.R.C., Notification of the Second Office Action and the Second Office Action, Application No. 200980155327.3, date mailed: Sep. 11, 2013, 7 pages.

Kazakhstan Office Action, Application No. 2011/1589.1, date mailed: Dec. 5, 2013, 4 pages.

Federal Institute for Industrial Property, Office Action, Application No. 2011262263/05(038814), date mailed: Nov. 28, 2012, 3 pages.

Federal Institute for Industrial Property, Office Action, Application No. 2011262263/05(038814), date mailed: Jul. 7, 2013, 4 pages.

Wrzesinski, W., et al., "Permeability and Corrosion Resistance of Reinforced Sulfur Concrete," Report of Investigations No. 9157, U.S. Department of the Interior, Bureau of Mines, pp. 1-13, 1988, cover page, bibliographic page, table of contents and abbreviation page.

Fengqing, J., "Sulfur Concrete Comes Into the World," *Jilin Building Materials*, vol. 4, pp. 40-43 (1998).

\* cited by examiner

STABILIZED SULFUR BINDING USING ACTIVATED FILLERS

This invention was made with government support under Contract No. DE-AC02-98CH10886 awarded by the U.S. Department of Energy. The United States government has certain rights in the invention.

CROSS REFERENCE TO RELATED APPLICATIONS

This application asserts priority to an International Application filed under the Patent Cooperation Treaty, PCT/RU2009/000020, filed on Jan. 26, 2009, the contents of which are incorporated herein by reference.

BACKGROUND OF THE INVENTION

Sulfur is an inexpensive, ubiquitous material that can be mined but is more commonly derived as a by-product from flue gas desulfurization processes and the purification of petroleum. In the 1970's, the U.S. government predicted that sulfur produced as a by-product would increase to such an extent that sulfur production would exceed demand and create storage and economic problems. Therefore, the U.S. Department of the Interior initiated a program in 1972 to develop alternative ways of utilizing sulfur.

Sulfur is thermoplastic in nature, therefore it can be melted and then cooled back to solid form. Because of this property, it can be mixed together with aggregate or fillers to form sulfur-based concretes and composite materials that can be used as an alternative to conventional hydraulic cement concretes. Sulfur concretes have very low permeability, high strength, and are resistant to many harsh chemicals (e.g., strong acids) that degrade conventional hydraulic cement concretes. In particular, after five years of industrial testing in over 50 corrosive environments, sulfur concrete materials exhibit excellent mechanical properties when compared to Portland cement concretes. See United States Department of the Interior Bureau of Mines Report of Investigations/1988, Wrzesinski, et al. "Permeability and Corrosion Resistance of Reinforced Sulfur Concrete" page 2, first column, middle of second paragraph; Mc. Bee W. C., Sullivan T. A. Development of specialized sulfur concretes, U.S. Department of the Interior, 1979, Bureau of Mines Report No. 8346, p. 22; Vroom A. H. Sulfurcrete Another option in the energy /Materials picture//Military Engineering.-1979. 71.-N 462, p. 250-252; and Sulfur concrete—golden opportunity//Consr. Prod.-1984. 27.-N1, p. 38.

However, pure sulfur goes through an allotropic solid phase transition, upon cooling below 95.5° C., from the monoclinic to the orthorhombic form which is more dense and occupies less volume. In other words, cooling of the sulfur results in an increase in density (shrinkage of the matrix) which introduces physical instabilities in the solid and makes the material highly stressed and susceptible to cracking and mechanical failure.

To remedy the problem caused by the allotropic solid phase transition of sulfur, scientists developed modified sulfur concretes. One of the modified sulfur concrete cements developed under the U.S. Department of Interior's program contains dicyclopentadiene (DCPD), and oligomers of cyclopentadiene, primarily the trimer through the pentamer. This cement allows the sulfur to polymerize such that the solid phase transition on cooling is suppressed and the resulting product is very durable.

A major drawback of the DCPD-modified cement, is that the cost of DCPD modifiers is relatively high and they are not readily available worldwide. Furthermore, DCPD imparts an unpleasant odor to the sulfur cement and its vapor is toxic even at low concentrations. See Kinkead, et al. "The Mammalian Toxicity of Dicyclopentadiene" Toxicology and Applied Pharmacology, 20 552-561 (1971) and Gregor R., Hackl A., A New Approach to Sulphur Concretes. Ch. In Advances in Chemistry Series, N 165, American Chemical Society, Washington, 1978, pp. 54-78.

Thus, the development of new readily available, less expensive modifiers is needed to expand the potential applications for low-cost sulfur concrete products. Furthermore, currently used methods of polymerization do not ensure homogenization within the sulfur matrix, which can impact durability and strength properties of the sulfur concrete or composite products.

SUMMARY OF THE INVENTION

It has been found that a stable, sulfur binding composite can be made by reacting sulfur with a combination of a solid aggregate that has been pre-treated with an organic modifier. The aggregate creates enhanced reaction sites containing surplus electron donors from the organic modifier that are activated by heating, e.g. to temperatures above about 180° C. to interact with sulfur. Conducting this reaction under energetic (e.g., high shear) mixing will further enhance the process. Furthermore, the sulfur binding composite is a sulfur polymer matrix that uses an organic chemical modifier to react with elemental sulfur and suppress a solid phase change when it occurs on cooling, i.e., the phase transition from monoclinic (beta) phase to orthorhombic (alpha) phase which occurs when elemental sulfur cools below 95° C. If not suppressed, the phase change can result in an increase in density of the solid causing the material to be internally stressed and subject to mechanical failure when loaded or shocked.

The method of making a stable, sulfur binding composite includes the following steps: i) providing a solid aggregate having a surface, the solid aggregate being selected from the group consisting of mineral fillers, ash, silica sand, industrial waste, and combinations thereof; ii) impregnating the aggregate with an organic modifier comprising unsaturated hydrocarbons with at least one double or triple covalent bond between adjacent carbon atoms to create a modifier-impregnated aggregate; iii) heating and drying the modifier-impregnated aggregate to activate the surface of the aggregate for reaction with sulfur; iv) adding a powdered solid or molten elemental sulfur to the modifier-impregnated aggregate; v) mixing the elemental sulfur and modifier-impregnated aggregate at a temperature high enough to melt any solid sulfur or maintain a molten state of elemental sulfur in combination with modifier-impregnated aggregate; and vi) cooling the liquid mixture to form a solid product.

A sulfur composite composition can include sulfur reacted with an organic modifier selected from the group consisting of black oil, gasoil, unsaturated hydrocarbons, rubber, and combinations thereof, and a solid aggregate selected from the group consisting of quartz, talc, wollastonite, calcite, dolomite, mica, kaolin, feldspar, barites, and combinations thereof, to form high strength sulfur composite products.

A modifier-impregnated aggregate for binding elemental sulfur can include, the aggregate including a solid aggregate selected from the group consisting of mineral fillers, ash, silica sand, industrial solid waste, or combinations thereof, and an organic modifier selected from the group consisting of black oil, gasoil, unsaturated hydrocarbons, rubber, or combinations thereof.

For a better understanding of the present invention, together with other and further advantages, reference is made to the following detailed description, and its scope will be pointed out in the claims.

DETAILED DESCRIPTION

The first step in the method for making a stable, sulfur binding composite, i.e., stabilized sulfur binding using activated fillers (SSBAF) or sulfur polymer cement, involves providing a fine particle sized solid aggregate such as mineral fillers (e.g., silica sand), ash, industrial waste, or combinations thereof. After selection, the solid aggregate is ground and/or sieved to provide a desired particle size.

Mineral fillers are a variety of solid particulate material that may be irregular, acicular (needle), fibrous or plate-like in shape. The most commonly used particulate fillers are industrial minerals such as quartz (silica sand), talc (magnesium silicate), wollastonite (calcium silicate), calcite (e.g., calcium carbonate), dolomite (calcium magnesium carbonate), mica (e.g., aluminum and potassium phyllosilicate or muscovite), kaolin (alumino silicate clay), feldspar (silicates of aluminum, containing sodium, potassium, iron, calcium, or barium or combinations of these elements) and barites (barium sulfate). Clay minerals can shrink and swell as a function of moisture content, and thereby compromise the structural integrity of the solid product. Thus, stable minerals e.g., quartz silicates are preferred and clay-like minerals are preferably avoided for the production of SSBAF.

Ash is a waste material produced from various sources including, but not limited to, coal-fired power plants, municipal solid waste-to-energy plants, and various metallurgical and chemical manufacturing processes.

Silica sand is naturally occurring granular material composed of finely divided silica particles. Silica is silicon dioxide, or $SiO_2$. Sand particles usually have a minimum diameter of about 625 microns (1/16 mm) and a maximum diameter of about 2 mm.

Industrial waste can include a wide variety of inert solid industrial by-products including mine and mill tailings, slags, and metallurgical wastes.

The solid aggregate has a maximum particle size of about 1 mm, preferably about 200 microns, more preferably about 150 microns, and most preferably about 100 microns. The solid aggregate has a minimum particle size of about 0.1 microns, preferably about 1 micron, and most preferably about 10 microns. The solid aggregate also preferably has a filler surface area of more than about 1,000 $cm^2/g$. Accordingly, the final particle size of the aggregate can range between about 0.1 microns and about 1 mm and preferably should be about 10 to 100 microns. Aggregates can be ground and/or sieved to achieve and confirm the appropriate final size; or the aggregates can just be sieved to confirm the appropriate size if the aggregate is obtained with the desired particle size.

Additional fine and coarse aggregate may be used in combination with SSBAF cement to form concrete materials in the same manner that sand and stone are added to hydraulic cement to form concrete with higher compressive strengths.

The aggregate used in preparation of SSBAF provides reaction sites to induce the initiation of the reaction of the organic modifier and elemental sulfur. The quality of the sulfur binding composite is dependent upon the quality of the aggregate. For example, aggregates should be inert, strong enough to withstand mixing with the organic modifier as well as mixing with the sulfur without degradation of mechanical properties (e.g., particle size), and free of impurities that could interact with the organic modifier or with the cement product. For example, clay materials can swell when in contact with moisture and may cause mechanical failure of the cement or concrete products produced using the cement.

The solid aggregate is present in the sulfur composite in a minimum amount of about 10 weight percent, more preferably 20 weight percent, and most preferably about 30 weight percent. The solid aggregate is present in the sulfur composite in a maximum amount of about 90 weight percent, more preferably about 80 weight percent, and most preferably about 70 weight percent.

The second step involves impregnating the aggregate with an organic modifier that contains unsaturated hydrocarbons which have at least one double or triple covalent bond between adjacent carbon atoms. The unsaturated hydrocarbons are highly reactive and serve as electron donors for addition reactions to their multiple bonds, creating carbon-sulfur bonds. These bonds form sulfur polymer chains which suppress the transition of the solid crystalline structure from monoclinic to orthorhombic during cooling, thereby providing stability to the sulfur polymer cement and the sulfur composite product that it is used to make.

Examples of potential organic modifiers for SSBAF include black oil, gasoil, unsaturated hydrocarbons, rubber, or combinations thereof. Black oil, gas oil, and catalytic cracking residue are terms used to describe residual products from the catalytic cracking process for conversion of heavy crude oil into lighter useful petroleum products such as gasoline, kerosene, and diesel fuel. Black oil is a low-grade, black petroleum oil used to lubricate slow-moving or rough-surfaced machinery where high-grade lubricants are impractical or too expensive. Gas oil (also known as No. 2 heating oil and diesel fuel) is a petroleum distillate, with a boiling range of 232-426° C. Cracking, also referred to as pyrolysis, is the breakdown of large alkanes into smaller, more useful alkenes and an alkane (non-reactive saturated hydrocarbon). In other words, cracking is the breaking of long chain hydrocarbons into shorter ones. Catalytic cracking uses a catalyst such as zeolite, aluminum hydrosilicate, bauxite or aluminosilicates to increase the speed of the cracking reaction. The rate of cracking and the end products are strongly dependent on the temperature and presence of catalysts.

In general, any sufficiently unsaturated hydrocarbon can be used as the organic modifier for the SSBAF process. One method to determine the level of unsaturated hydrocarbons is by means of the iodine value (or "iodine adsorption value," "iodine number" or "iodine index") which is the mass of iodine in grams that is consumed by 100 grams of a chemical substance. An iodine solution is yellow/brown in color and any chemical group in the substance that reacts with iodine will make the color disappear at a precise concentration. The amount of iodine solution thus required to keep the solution yellow/brown is a measure of the amount of iodine sensitive reactive groups. One application of the iodine number is the determination of the amount of unsaturated hydrocarbons in petroleum products. This unsaturation is in the form of double bonds which react with iodine compounds. The higher the iodine number, the more unsaturated hydrocarbon bonds are present. For SSBAF, the iodine number should be a minimum of 0.8 g per 100 g.

Rubber includes rubber monomers and polymerized rubber that have not been vulcanized, i.e., cross-linked by sulfur. Examples of rubber monomers include, but are not limited to, isoprene (2-methyl-1,3-butadiene), 1,3-butadiene, chloroprene (2-chloro-1,3-butadiene), isobutylene (methylpropene), and styrene (vinyl benzene). Rubber is defined as any high polymer the volume of which can be reduced by 10% under a pressure equal or less than 10,000 kg/cm2 and the viscosity of which is greater than 100 poises. (ASTM derived).

The organic modifier is present in the sulfur composite in a minimum amount of about 1 weight percent, preferably 1.25 weight percent, and more preferably about 1.5 weight percent. The organic modifier is present in the sulfur composite in a maximum amount of from about 10 weight percent, preferably about 7 weight percent, and more preferably about 3 weight percent.

The third step involves heating and drying the modifier-impregnated aggregate, created in the second step, to achieve displacement of donor electrons from the modifier to the surface of the aggregate. This serves to activate the surface of the aggregate (e.g., mineral filler) for reaction with the sulfur. The modifier-impregnated aggregate is heated until the mixture forms a dry powder. During the process of heating the mixture, unsaturated carbon bonds are activated on the surface of the aggregate. Temperatures for this step can range from about 130° C. to about 200° C., and most preferably about 150° C. to about 190° C.

The fourth step involves adding powdered solid or molten (liquid) elemental sulfur to the modifier-impregnated aggregate.

The powdered solid or molten elemental sulfur can come from various sources including mines or flue gas desulfurization processes and the purification of petroleum and gas. The SSBAF cement does not require high purity quality sulfur. Off-grade sulfur containing hydrocarbon impurities may be used. However, hydrogen sulfide ($H_2S$) should be removed from the sulfur.

The sulfur is present in the composite in a minimum amount of about 10 weight percent, preferably in a minimum amount of about 20 weight percent, and more preferably in a minimum amount of about 28 weight percent. The sulfur is present in the composite in a maximum amount of about 90 weight percent, preferably in a maximum amount of about 80 weight percent, and more preferably in a maximum amount of about 68 weight percent.

The fifth step involves mixing the elemental sulfur and modifier-impregnated aggregate at a temperature high enough to melt any solid sulfur to liquid or maintain a molten state of the elemental sulfur in combination with the modifier-impregnated aggregate, ensuring constant homogeneous mixing. Preferably, the sulfur and modifier-impregnated aggregate is heated in step five to a temperature of about 120° C. to about 210° C. to assist in the formation of sulfur polymer chains and stabilize the non-crystalline, monoclinic structure of sulfur upon cooling.

In a preferred embodiment, the mixing in step five may be done using a high shear, vortex, or ultrasonic mixing system capable of introducing sufficient energy into the system to effect the sulfur composite reaction.

The sixth step involves cooling the liquid mixture to form a solid product. Preferably, quick cooling (quenching) is used by exposure to cooling air or water which will rapidly reduce the temperature below the freezing point. The sulfur composite is stable in the sense that it resists crumbling, cracking and degradation under environmental conditions due to a suppression of phase transition upon cooling. The shape of the solid can be manipulated to form pellets, granules, flakes, or powder that can be easily packaged and re-melted for later use. Pellets can be formed by passing molten sulfur through a lattice or screen, creating liquid droplets that are then quickly cooled by water quenching or air cooling. Granules or flakes are created by placing liquid sulfur on a moving flat belt, air cooled and size reduced. Powder can be formed by spraying the molten mixture through a nozzle to create small droplets followed by quenching. Alternatively, sulfur polymer can be formulated directly into poured concrete products. These products can be placed in a form or mold and left to cool to a solid under ambient conditions or subjected to accelerated cooling, as described.

In a preferred embodiment, the SSBAF concrete is produced with the proviso that the concrete does not contain (DCPD) and oligomers of cyclopentadiene.

The method is used to create a sulfur polymer cement that can be used in a sulfur composite product having high strength (e.g., 25-40 MPa compressive strength). If the SSBAF product is formed into a pelletized, granular, flake, or powder form following cooling to a solid, it can be stored for later use as a sulfur cement binder. The product may also be combined with additional aggregate of varying size at the time of production or at a later time and cooled directly to form a sulfur polymer concrete with even higher compressive strengths ($\geq 70$ MPa).

The percentages of each component, i.e., solid aggregate, organic modifier, and sulfur, within the composition highly depend upon the choice of component of solid aggregate and organic modifier. Appropriate percentages can be determined by a person of skill in the art.

Choice of materials and quantity directly affects the properties of the concrete cement such as the resistance to attack by acid and salt solutions, minimum moisture absorption, mechanical strength properties, workability, and shrinkage on solidification and coefficients of thermal expansion compatible with other construction materials. The choice and amounts of aggregate, organic modifier, and sulfur included in a particular sulfur cement concrete can be determined by one of ordinary skill in the art.

In one embodiment of the invention the composition is a sulfur binding composite comprising sulfur reacted with an organic modifier and a solid aggregate. Another embodiment of the invention is a modifier-impregnated aggregate for binding element sulfur comprising solid aggregate and an organic modifier.

The applications of sulfur polymer concretes are numerous. For example, sulfur polymer concrete can be used in place of conventional hydraulic cement concretes for construction of poured concrete foundations, slabs, tanks, etc., construction of artificial reefs, off-shore fill, footings, bulkheads, road paving, sidewalks, tiles, pipes, pavements, swimming pools, industrial tanks, railway ties, and parking lot bumper stops. Sulfur polymer concrete can be used as a synthetic aggregate for construction of road base foundations. Additionally, sulfur concretes can be used for applications where the concrete is exposed to corrosive environments, e.g., flooring in locations where acids are handled.

The specific application for sulfur concrete determines the physical specifications the concrete will have to meet.

The present invention may be better understood by reference to the following examples. The following examples illustrate the present invention and are not intended to limit the invention or its scope in any manner.

EXAMPLES

An SSBAF sulfur polymer cement was made using cracking gasoil, sulfur, and sand. The hydrocarbon modifier was obtained from the Pavlodar refinery in Kazakhstan. The cracking gasoil has the following properties: 270-430° C., boiling range; 0.82 g/cm³ density; and 4.2 g/100 g iodine number. The iodine number is a measure of the amount of unsaturation of the hydrocarbons in the oil. Oils produced by catalytic cracking tend to be rich in unsaturated hydrocarbons. The sulfur was obtained from a Moscow oil refinery and had a purity level of greater than 99%. Quartz sand from Moscow that met the construction standards of Russia and Kazakhstan was used.

The sulfur concretes were made by the following method:

(1) Quartz sand was provided. The particles of sand greater than 0.8 to 1 mm were discarded. The sand was ground in a cone grinder to the condition of light powder with particles less than 200 microns. The particle size was checked by corresponding sieves.

(2) The sand powder was impregnated by a liquid modifier.

(3) The sand/modifier mixture was dried to a temperature about 180-190° C. to a condition of a dry mix (dry gray powder).

(4) Sulfur was added to the mixture and the mixture was mixed in a rotary grinder without grinding the filler.

(5) The mixture was melted at a temperature of about 180-190° C.

(6) The molten mixture was poured into molds and cooled at ambient temperature.

Compressive strength testing was carried out using the American Society for Testing and Materials standard test, ASTM C-39. Compressive strength, the ability of a material to withstand stress without catastrophic failure, was measured in Mega Pascals (MPa).

Four different compositions of sulfur concrete (A, B, C, and D) were tested. The percentages of sand, sulfur, and modifier by weight for the four compositions were as follows:

|   | Percentage of Sand:Sulfur:Modifier |
|---|---|
| A | 58%:39%:3% |
| B | 48.5%:48.5%:3% |
| C | 39%:59%:2% |
| D | 29.5%:69%:1.5% |

Five samples of each of the four concretes listed above were tested. The average results of the compressive strength testing are shown in Table 1 below.

|   | A | B | C | D |
|---|---|---|---|---|
| Compressive Strength, MPa | 28.45 | 32.60 | 35.54 | 38.16 |

The results indicated that high strength concrete can be made with cracking gasoil modifier over a wide range of sulfur and aggregate mixtures. The compressive strengths of the sulfur concretes were comparable to Portland cement concrete, which has a compressive strength of approximately 34.5 MPa (5,000 psi).

Thus, while there have been described what are presently believed to be the preferred embodiments of the present invention, those skilled in the art will appreciate other and further changes and modifications thereto, and it is intended to include such other changes as come with the scope of the invention as set forth in the following claims.

The invention claimed is:

1. A method of making a stable, sulfur binding composite comprising:
   i) providing a solid aggregate having a surface, the solid aggregate being selected from the group consisting of mineral fillers, ash, silica sand, industrial waste, and combinations thereof;
   ii) impregnating the solid aggregate with an organic modifier comprising unsaturated hydrocarbons with at least one double or triple covalent bond between adjacent carbon atoms to create a modifier-impregnated aggregate;
   iii) heating and drying the modifier-impregnated aggregate to activate the surface of the modifier-impregnated aggregate for reaction with sulfur;
   iv) adding a powdered solid or molten elemental sulfur to the modifier-impregnated aggregate;
   v) mixing the elemental sulfur and modifier-impregnated aggregate at a temperature high enough to melt any solid sulfur or maintain a molten state of elemental sulfur in combination with modifier-impregnated aggregate; and
   vi) cooling the liquid mixture to form a solid product.

2. A method according to claim 1, wherein after providing a solid aggregate, the solid aggregate is ground or sieved to provide solid aggregate with desired particle sizes.

3. A method according to claim 1, wherein the solid aggregate has a maximum particle size of about 1 mm.

4. A method according to claim 1, wherein the solid aggregate has a maximum 25 particle size of about 200 microns.

5. A method according to claim 1, wherein the solid aggregate has a maximum particle size of about 150 microns.

6. A method according to claim 1, wherein the solid aggregate has a maximum particle size of about 100 microns.

7. A method according to claim 1, wherein the solid aggregate has a minimum particle size of about 10 microns.

8. A method according to claim 1, wherein the solid aggregate has a minimum particle size of about 1 micron.

9. A method according to claim 1, wherein the solid aggregate has a minimum particle size of about 0.1 microns.

10. A method according to claim 1, wherein the solid aggregate are mineral fillers selected from the group consisting of quartz, talc, wollastonite, calcite, dolomite, mica, kaolin, feldspar, barites, and combinations thereof.

11. A method according to claim 10, wherein the solid aggregate is quartz.

12. A method according to claim 1, wherein the composite is substantially free of clay-like materials.

13. A method according to claim 1, wherein the solid aggregate has a filler surface area of greater than about 1,000 cm2/g.

14. A method according to claim 1, wherein the organic modifier is selected from the group consisting of black oil, gasoil, rubber, or combinations thereof.

15. A method according to claim 1, wherein heating and drying in step iii) activates unsaturated carbon bonds on the surface of the modifier-impregnated aggregate.

16. A method according to claim 15, wherein the modifier-impregnated aggregate is heated from about 130° C. to about 200° C.

17. A method according to claim 16, wherein the modifier-impregnated aggregate is heated from about 150° C. to about 190° C.

18. A method according to claim 1, wherein the elemental sulfur in step iv) is powdered or molten.

19. A method according to claim 1, wherein the solid product is in the form of pellets, granules, flakes, or powder.

20. A method according to claim 19, wherein step vi) further comprises re-melting and combining the solid product with additional modifier-impregnated aggregate to produce sulfur concrete products.

21. A method according to claim 1, wherein the sulfur and modifier-impregnated aggregate is heated in step v) to a temperature of from about 120° C. to about 210° C.

22. A method according to claim 1, wherein the mixing in step v) is done using a high shear, vortex, or ultrasonic mixing system capable of introducing sufficient energy into the system to effect a sulfur composite reaction.

23. A method according to claim 1, wherein the solid aggregate is present in the composite in a minimum amount of about 10 weight percent.

24. A method according to claim 1, wherein the solid aggregate is present in the 15 composite in a minimum amount of about 20 weight percent.

25. A method according to claim 1, wherein the solid aggregate is present in the composite in a minimum amount of about 30 weight percent.

26. A method according to claim 1, wherein the solid aggregate is present in the composite in a maximum amount of about 90 weight percent.

27. A method according to claim 1, wherein the solid aggregate is present in the composite in a maximum amount of about 80 weight percent.

28. A method according to claim 1, wherein the solid aggregate is present in the composite in a maximum amount of about 70 weight percent.

29. A method according to claim 1, wherein the elemental sulfur is present in the composite in a minimum amount of about 10 weight percent.

30. A method according to claim 1, wherein the elemental sulfur is present in the composite in a minimum amount of about 28 weight percent.

31. A method according to claim 1, wherein the elemental sulfur is present in the composite in a maximum amount of about 90 weight percent.

32. A method according to claim 1, wherein the elemental sulfur is present in the composite in a maximum amount of about 68 weight percent.

33. A method according to claim 1, wherein the organic modifier is present in the composite in a minimum amount of about 1 weight percent.

34. A method according to claim 1, wherein the organic modifier is present in the composite in a minimum amount of about 1.5 weight percent.

35. A method according to claim 1, wherein the organic modifier is present in the composite in a maximum amount of about 10 weight percent.

36. A method according to claim 1, wherein the organic modifier is present in the composite in a maximum amount of about 7 weight percent.

37. A method according to claim 1, wherein the organic modifier is present in the composite in a maximum amount of about 3 weight percent.

* * * * *